US011214189B2

(12) United States Patent
Shibata (10) Patent No.: US 11,214,189 B2
(45) Date of Patent: Jan. 4, 2022

(54) VEHICLE LAMP SYSTEM, VEHICLE LAMP CONTROL DEVICE AND VEHICLE LAMP CONTROL METHOD

(71) Applicant: KOITO MANUFACTURING CO., LTD., Tokyo (JP)

(72) Inventor: Yoshinori Shibata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/751,511

(22) Filed: Jan. 24, 2020

(65) Prior Publication Data

US 2020/0238895 A1   Jul. 30, 2020

(30) Foreign Application Priority Data

Jan. 25, 2019   (JP) .............................. JP2019-011641

(51) Int. Cl.
*G06K 9/20* (2006.01)
*B60Q 1/14* (2006.01)
(Continued)

(52) U.S. Cl.
CPC ........... *B60Q 1/143* (2013.01); *B60Q 1/0023* (2013.01); *G06T 7/20* (2013.01); *H04N 5/2351* (2013.01);
(Continued)

(58) Field of Classification Search
CPC ............ B60Q 2300/314; B60Q 1/1423; B60Q 2300/054; B60Q 1/143; B60Q 1/0023;
(Continued)

(56) References Cited

U.S. PATENT DOCUMENTS 8,729,803 B2 *   5/2014   Yamazaki .............. B60Q 1/143
                                                                  315/82
9,200,780 B2 *  12/2015   Suckling ............... F21S 41/663
(Continued)

FOREIGN PATENT DOCUMENTS

CN      104284808 A     1/2015
JP      2011-111000 A   6/2011
(Continued)

OTHER PUBLICATIONS

Communication dated May 25, 2021 issued by the Institut National De La Propriete Industrielle in application No. FR2000687.
(Continued)

*Primary Examiner* — Patrick E Demosky
(74) *Attorney, Agent, or Firm* — Sughrue Mion, PLLC (57) ABSTRACT

A vehicle lamp system includes an imaging unit which images a front of an own vehicle to generate image information, an imaging control unit which controls the imaging unit to perform an operation of generating image information with a first time period and an operation of generating image information with a second time period, a luminance analysis unit which detects luminance of individual regions in front of the own vehicle, an illuminance setting unit which determines a light distribution pattern. The illuminance setting unit, for an individual region whose luminance is within a high luminance range, sets an illuminance value such that luminance of the individual region decreases due to formation of the light distribution pattern, and for an individual region whose luminance is within a low luminance range, sets an illuminance value such that luminance of the individual region increases due to formation of the light distribution pattern.

8 Claims, 5 Drawing Sheets

(51) Int. Cl.
*B60Q 1/00* (2006.01)
*H04N 5/235* (2006.01)
*G06T 7/20* (2017.01)

(52) U.S. Cl.
CPC . *H04N 5/2354* (2013.01); *G06T 2207/30252* (2013.01)

(58) Field of Classification Search
CPC ............... G01J 1/4204; G06T 7/20; G06T 2207/30252; H04N 5/2351; H04N 5/2354; G06K 9/2027
See application file for complete search history.

(56) References Cited

U.S. PATENT DOCUMENTS

| | | | |
|---|---|---|---|
| 2004/0143380 A1* | 7/2004 | Stam | B60Q 1/085 701/36 |
| 2008/0129206 A1* | 6/2008 | Stam | G06K 9/00791 315/82 |
| 2013/0169155 A1* | 7/2013 | Nakashima | B60Q 1/14 315/82 |
| 2014/0333201 A1* | 11/2014 | Foltin | B60Q 1/143 315/82 |
| 2014/0362594 A1* | 12/2014 | Higgins-Luthman | B60Q 1/245 362/465 |
| 2015/0055357 A1* | 2/2015 | Nakatani | F21S 41/663 362/466 |
| 2015/0085514 A1 | 3/2015 | Yagi | |
| 2015/0127227 A1 | 5/2015 | Strolz et al. | |
| 2017/0106793 A1* | 4/2017 | Kumar | B60Q 9/005 |
| 2018/0031200 A1* | 2/2018 | Park | F21S 41/141 |
| 2019/0202343 A1* | 7/2019 | Funk | F21S 41/153 |
| 2020/0139879 A1 | 5/2020 | Shibata et al. | |
| 2021/0031675 A1 | 2/2021 | Shibata et al. | |

FOREIGN PATENT DOCUMENTS

| | | |
|---|---|---|
| JP | 2015-64964 A | 4/2015 |
| JP | 2016088224 A | 5/2016 |
| WO | 2018135356 A1 | 7/2018 |
| WO | 2019/003887 A1 | 1/2019 |

OTHER PUBLICATIONS

Communication dated Sep. 24, 2021 from the National Intellectual Property Administration of the People's Republic of China in Application No. 202010078284.1.

* cited by examiner

VEHICLE LAMP SYSTEM, VEHICLE LAMP CONTROL DEVICE AND VEHICLE LAMP CONTROL METHOD

CROSS-REFERENCE TO RELATED APPLICATIONS

This application is based upon and claims the benefit of priority from Japanese patent application No. 2019-011641, filed on Jan. 25, 2019, the entire contents of which are incorporated herein by reference.

TECHNICAL FIELD

Aspects of the present invention relate to a vehicle lamp system, a vehicle lamp control device and a vehicle lamp control method, and particularly relate to a vehicle lamp system, a vehicle lamp control device and a vehicle lamp control method which are used in an automobile or the like.

BACKGROUND ART

There has been proposed adaptive driving beam (ADB) control which dynamically and adaptively controls a light distribution pattern of a high beam based on conditions around a vehicle. The ADB control includes detecting, by a camera, presence or absence of a target which should avoid being irradiated with high luminance light, that is, a dimming target located in front of an own vehicle, and dimming or turning off the light to be radiated to a region corresponding to the dimming target (for example, see JP-A-2015-064964).

Examples of the dimming target include a front vehicle such as a preceding vehicle or an oncoming vehicle. Glare given to a driver of the front vehicle can be reduced by dimming or turning off the light to be radiated to a region corresponding to the front vehicle. Further examples of the dimming target include a reflective object having high reflectance such as a visual line guide (a delineator), a signboard or a road sign on roadside. Glare given to a driver of the own vehicle due to light reflected by such reflective object can be reduced by dimming light to be radiated to a region corresponding to the reflective object.

When a reflective object is irradiated with light, the reflective object becomes a high luminance body in image information of a camera. Therefore, in a light distribution pattern determined based on the image information, illuminance of a region corresponding to the reflective object is reduced. When the light distribution pattern is formed, since the reflective object is not a self-luminous body, the reflective object becomes a low luminance body in image information obtained under such light distribution pattern. Therefore, in the light distribution pattern determined based on this image information, the illuminance of the region corresponding to the reflective object is increased. That is, the reflective object periodically switches between a state of radiating (reflecting) light to the own vehicle and a state of not radiating light to the own vehicle. If this switching is fast, a driver of the own vehicle visually recognizes the reflective object at brightness obtained by averaging brightness when luminance is high and brightness when the luminance is low.

In recent years, as luminance of vehicle lamps is increasing, intensity of light reflected by a reflective object tends to increase. Therefore, measures against reduction of visibility of the driver due to glare caused by the reflective object are more strongly desired. However, in the related-art ADB control, the brightness of the reflective object visually recognized by the driver is constant and cannot be adjusted. Therefore, there is room for improving the visibility of the driver of the own vehicle in the related-art ADB control.

Accordingly, the present invention has been made in view of the above circumstances, and an aspect of the present invention provides a technique for improving the visibility of the driver.

According to an embodiment of the present invention, there is provided a vehicle lamp system. A vehicle lamp system includes: an imaging unit configured to take an image in front of an own vehicle to generate image information; an imaging control unit configured to control the imaging unit so as to perform a combination of a first operation of generating image information with a first time period and a second operation of generating image information with a second time period having a length different from the first time period; a luminance analysis unit configured to detect luminance of each of a plurality of individual regions arranged in front of the own vehicle based on the image information obtained from the imaging unit; an illuminance setting unit configured to determine an illuminance value of light to be radiated to each individual region based on a detection result of the luminance analysis unit so as to determine a light distribution pattern to be formed, the illuminance setting unit being configured to: for an individual region whose luminance is within a predetermined high luminance range, set an illuminance value such that luminance of the individual region decreases due to formation of the light distribution pattern; and for an individual region whose luminance is within a predetermined low luminance range, set an illuminance value such that luminance of the individual region increases due to formation of the light distribution pattern; a light source unit configured to independently adjust illuminance of the light to be radiated to each of the plurality of individual regions; and a light source control unit configured to control the light source unit so as to form the light distribution pattern. According to this embodiment, visibility of a driver can be improved.

In the above, the imaging control unit may be configured to control the imaging unit to alternately repeat the first operation and the second operation. In the above, the luminance analysis unit may be configured to binarize the luminance in each of the plurality of individual regions, and the illuminance setting unit may be configured to set a first illuminance value for an individual region having a relatively high luminance and set a second illuminance value higher than the first illuminance value for an individual region having a relatively low luminance. In the above, the light source control unit may be configured to control the light source unit so as to form a reference light distribution pattern independent of the illuminance value determined by the illuminance setting unit at a predetermined timing, the second time period may be longer than the first time period, and the imaging control unit may be configured to control the imaging unit to perform the first operation under formation of the reference light distribution pattern. In the above, the light source control unit may be configured to control the light source unit so as to form a reference light distribution pattern independent of the illuminance value determined by the illuminance setting unit at a predetermined timing, the second time period may be longer than the first time period, and the imaging control unit may be configured to control the imaging unit to perform the second operation under formation of the reference light distribution pattern. Further, in the above, the vehicle lamp system may further include: a target analysis unit configured to detect a predetermined target in front of the own vehicle based on the information obtained from the imaging unit; and a tracking unit configured to detect a displacement of the predetermined target detected by the target analysis unit based on the detection result of the luminance analysis unit. The illuminance setting unit may be configured to determine a specific illuminance value for a specific individual region determined according to a position of the target based on a detection result of the tracking unit.

According to another embodiment of the present invention, there is provided a vehicle lamp control device. The vehicle lamp control device includes: an imaging control unit configured to control an imaging unit which is configured to take an image in front of an own vehicle to generate image information, so as to perform a combination of a first operation of generating image information with a first time period and a second operation of generating image information with a second time period having a length different from the first time period; a luminance analysis unit configured to detect luminance of each of a plurality of individual regions arranged in front of the own vehicle based on the image information obtained from the imaging unit; an illuminance setting unit configured to determine an illuminance value of light to be radiated to each individual region based on a detection result of the luminance analysis unit so as to determine a light distribution pattern to be formed, the illuminance setting unit being configured to: for an individual region whose luminance is within a predetermined high luminance range, set an illuminance value such that luminance of the individual region decreases due to formation of the light distribution pattern; and for an individual region whose luminance is within a predetermined low luminance range, set an illuminance value such that luminance of the individual region increases due to formation of the light distribution pattern; and a light source control unit configured to control a light source unit which is configured to independently adjust illuminance of the light to be radiated to each of the plurality of individual regions, so as to form the light distribution pattern.

According to a further embodiment of the present invention, there is provided a vehicle lamp control method. The vehicle lamp control method includes: controlling an imaging unit configured to take an image in front of an own vehicle to generate image information, so as to perform a combination of a first operation of generating image information with a first time period and a second operation of generating image information with a second time period having a length different from the first time period; detecting luminance of each of a plurality of individual regions arranged in front of the own vehicle based on the image information obtained from the imaging unit; determining an illuminance value of light to be radiated to each individual region based on the detected luminance so as to determine a light distribution pattern to be formed, the determining including: for an individual region whose luminance is within a predetermined high luminance range, setting an illuminance value such that luminance of the individual region decreases due to formation of the light distribution pattern; and for an individual region whose luminance is within a predetermined low luminance range, setting an illuminance value such that luminance of the individual region increases due to formation of the light distribution pattern; and controlling a light source unit configured to independently adjust illuminance of the light to be radiated to each of the plurality of individual regions, so as to form the light distribution pattern.

Any combinations of the above-described constituting elements, and implementations of the present invention in form of methods, devices, systems and the like are also effective as aspects of the present invention.

According to the above configuration, the visibility of the driver can be improved.

DESCRIPTION OF EMBODIMENTS

Hereinafter, embodiments of the present invention will be described with reference to the drawings. The embodiment is not intended to limit the present invention and is merely illustrative, and any features and combinations thereof described in the embodiment are not necessarily essential to the present invention. The same or equivalent components, members, and processing shown in the drawings are denoted by the same reference numerals, and a duplicative description thereof will be omitted. Scale and shape of each part shown in each of the drawings are set for convenience to simplify the description, and are not to be construed as limitations unless otherwise specified. When terms "first", "second" and the like are used in the present specification or claims, these terms are not intended to represent any order or importance and are merely intended to distinguish one configuration from another unless otherwise specified. Some of the members which are not required for describing the embodiment in the drawings are omitted.

Figure 1:
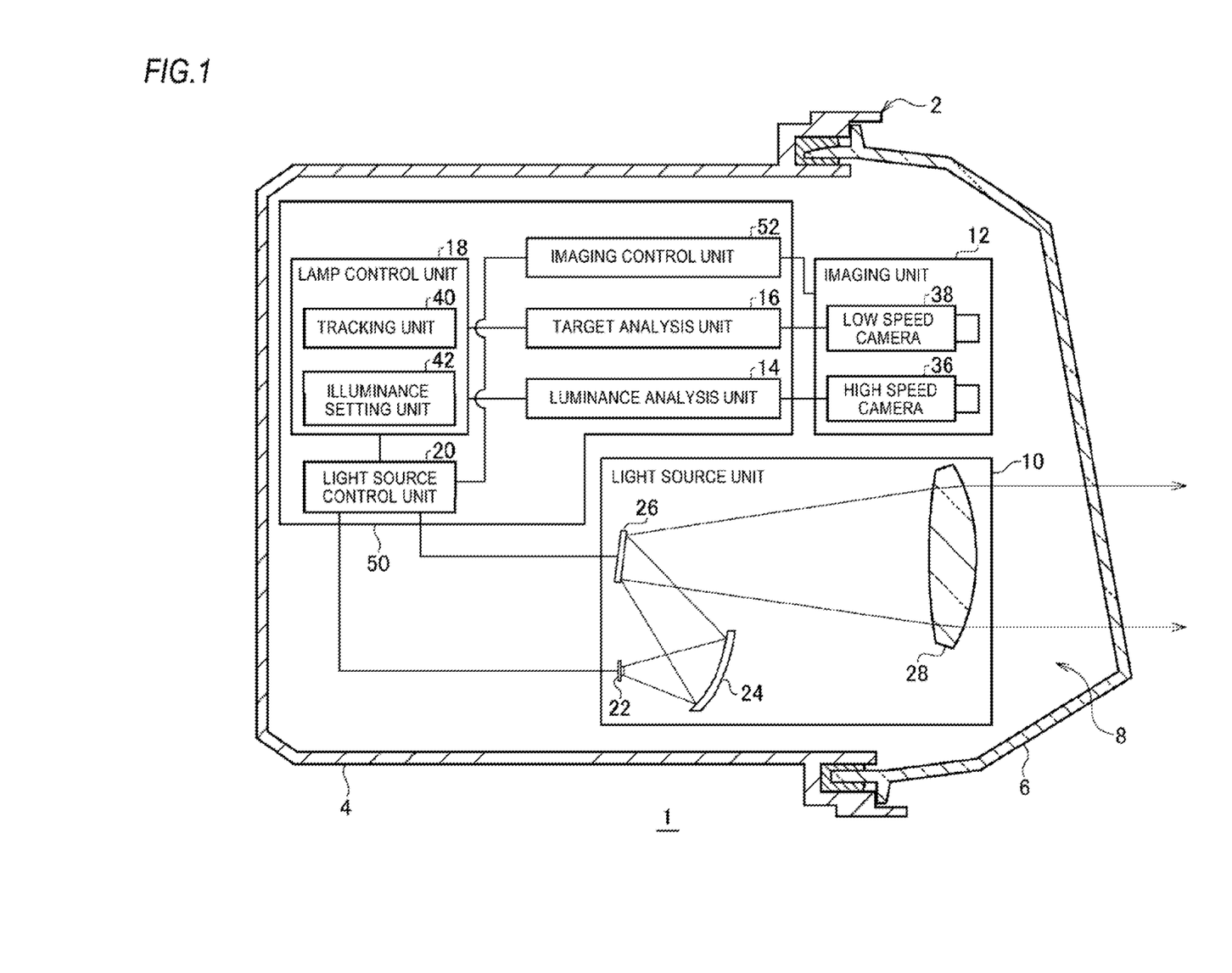
FIG. 1 is a diagram showing a schematic configuration of a vehicle lamp system according to an embodiment.

FIG. 1 is a diagram showing a schematic configuration of a vehicle lamp system according to an embodiment. In FIG. 1, some components of a vehicle lamp system 1 are illustrated as functional blocks. These functional blocks may be implemented by elements and circuits including a CPU and a memory of a computer as a hardware configuration and may be implemented by a computer program or the like as a software configuration. It will be appreciated by those skilled in the art that these functional blocks can be implemented in various forms by a combination of hardware and software.

The vehicle lamp system 1 is applied to a vehicle headlamp device including a pair of headlamp units disposed on left and right sides in the front of a vehicle. Since the pair of headlamp units has substantially the same configuration except that the pair of headlight units has a bilaterally symmetrical structure, FIG. 1 shows the structure of one headlamp unit as a vehicle lamp 2.

The vehicle lamp 2 of the vehicle lamp system 1 includes a lamp body 4 having an opening on a front side of the vehicle, and a light-transmitting cover 6 provided to cover the opening of the lamp body 4. The light-transmitting cover 6 is formed of a light-transmitting resin, glass or the like. A light source unit 10, an imaging unit 12 and a control device 50 are accommodated in a lamp chamber 8 formed by the lamp body 4 and the light-transmitting cover 6.

The light source unit 10 is a device capable of independently adjusting illuminance (intensity) of light to be radiated to each of a plurality of individual regions (see FIG. 3) arranged in front of an own vehicle. The light source unit 10 includes a light source 22, a reflection optical member 24, a light deflection device 26 and a projection optical member 28. Each part is attached to the lamp body 4 by a support mechanism (not shown).

The light source 22 may be a semiconductor light emitting element such as a light emitting diode (LED), an laser diode (LD) and an electroluminescence (EL) element, or may be a light bulb, an incandescent lamp (a halogen lamp), a discharge lamp or the like.

The reflection optical member 24 is configured to guide light emitted from the light source 22 to a reflection surface of the light deflection device 26. The reflection optical member 24 includes a reflection mirror whose inner surface is a predetermined reflection surface. The reflection optical member 24 may be a solid light guide or the like. If the light emitted from the light source 22 can be directly guided to the light deflection device 26, the reflection optical member 24 may not be provided.

The light deflection device 26 is disposed on an optical axis of the projection optical member 28 and is configured to selectively reflect the light emitted from the light source 22 to the projection optical member 28. The light deflection device 26 is, for example, a digital mirror device (DMD). That is, the light deflection device 26 includes a plurality of micro mirrors arranged in an array (a matrix). A reflection direction of the light emitted from the light source 22 can be selectively changed by respectively controlling angles of reflection surfaces of the plurality of micro mirrors. That is, the light deflection device 26 can reflect a part of the light emitted from the light source 22 toward the projection optical member 28 and reflect other of the light in a direction in which the light is not effectively used by the projection optical member 28. Here, the direction in which the light is not effectively used can be regarded as, for example, a direction in which the light is incident on the projection optical member 28 but hardly contributes to formation of a light distribution pattern, or a direction toward a light absorption member (a light shielding member) (not shown).

Figure 2A:
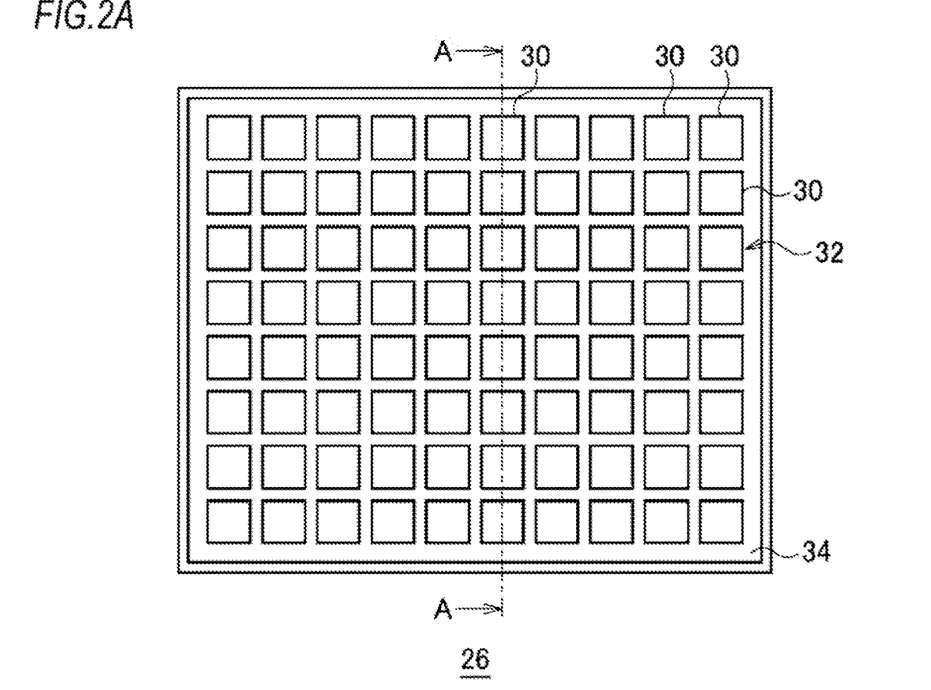
FIG. 2A is a front view showing a schematic configuration of a light deflection device.
Figure 2B:
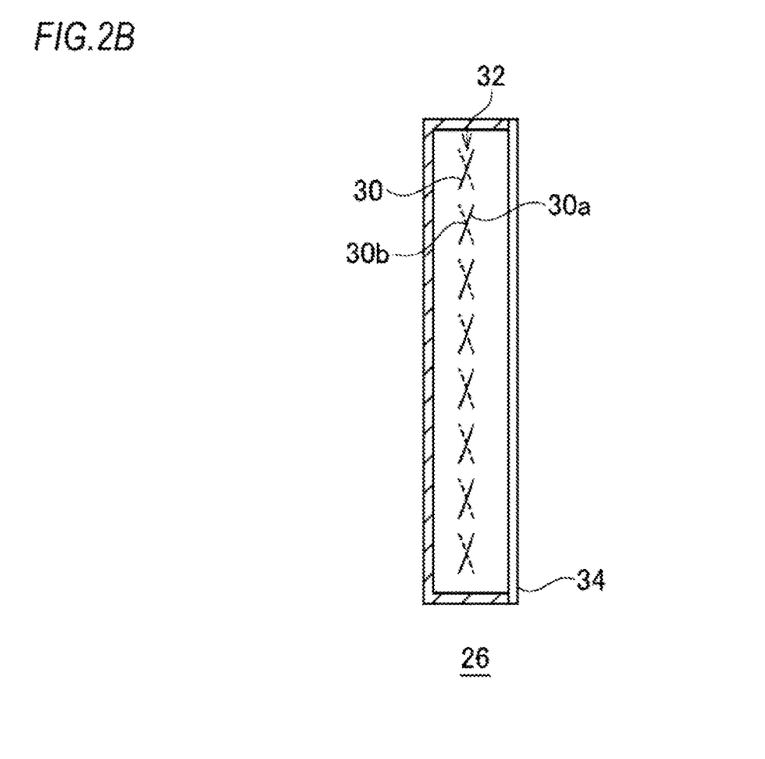
FIG. 2B is a cross-sectional view taken along line A-A of the light deflection device shown in FIG. 2A.

FIG. 2A is a front view showing a schematic configuration of the light deflection device 26. FIG. 2B is a cross-sectional view taken along line A-A of the light deflection device shown in FIG. 2A. The light deflection device 26 includes a micro mirror array 32 in which a plurality of micro mirror elements 30 are arranged in a matrix, and a transparent cover member 34 disposed on a front side of a reflection surface 30a of each mirror element 30 (on a right side of the light deflection device 26 shown in FIG. 2B). The cover member 34 is formed of, for example, glass or plastic.

The mirror element 30 has a substantially square shape and includes a rotation shaft 30b which extends in a horizontal direction and substantially equally divides the mirror element 30. Each mirror element 30 of the micro mirror array 32 is configured to be switchable between a first reflection position (a position indicated by a solid line in FIG. 2B) and a second reflection position (a position indicated by a dotted line in FIG. 2B). At the first reflection position, the light emitted from the light source 22 is reflected toward the projection optical member 28 so as to be used as a pan of a desired light distribution pattern. At the second reflection position, the light emitted from the light source 22 is reflected so as to be not effectively used. Each mirror element 30 rotates around the rotation shaft 30b and is individually switched between the first reflection position and the second reflection position. Each mirror element 30 takes the first reflection position when turned on and takes the second reflection position when turned off.

Figure 3:
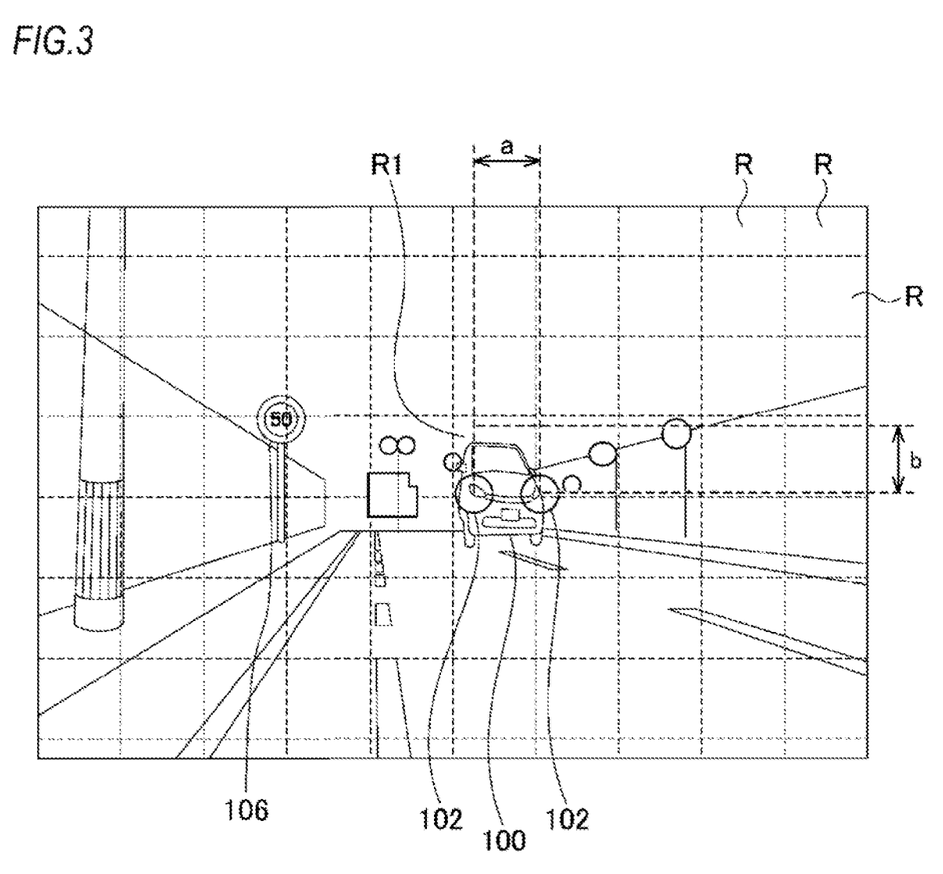
FIG. 3 is a view schematically showing a state in front of an own vehicle.

FIG. 3 is a view schematically showing a state in front of the own vehicle. As described above, the light source unit 10 includes the plurality of mirror elements 30 as individual radiation units capable of radiating light to a front side of the lamp independently from each other. The light source unit 10 can radiate light to a plurality of individual regions R arranged in front of the own vehicle by the mirror elements 30. Each individual region R corresponds to one pixel or a set of a plurality of pixels of the imaging unit 12, more specifically, for example, one pixel or a set of a plurality of pixels of a high speed camera 36. In the present embodiment, each individual region R and each mirror element 30 are associated with each other.

In FIGS. 2A and 3, for convenience of explanation, the mirror elements 30 and the individual regions R are arranged in a horizontal 10×vertical 8 array, but the numbers of the mirror elements 30 and the individual regions R are not particularly limited thereto. For example, resolution of the micro mirror array 32 (in other words, the numbers of the mirror elements 30 and the individual regions R) may be 1,000 pixels to 300,000 pixels. Time required for the light source unit 10 to form one light distribution pattern is, for example, 0.1 ms to 5 ms. That is, the light source unit 10 can change the light distribution pattern every 0.1 ms to 5 ms.

As shown in FIG. 1, the projection optical member 28 is formed of, for example, a free curved surface lens whose front side surface and rear side surface are in a free curved surface shape. The projection optical member 28 projects a light source image, which is formed on a rear focal plane including a rear focal point thereof, forward of the lamp as a reverse image. The projection optical member 28 is disposed such that the rear focal point thereof is located on an optical axis of the vehicle lamp 2 and in vicinity of a reflection surface of the micro mirror array 32. The projection optical member 28 may be a reflector.

The light emitted from the light source 22 is reflected by the reflection optical member 24 to be radiated to the micro mirror array 32 of the light deflection device 26. The light deflection device 26 reflects the light toward the projection optical member 28 by a predetermined mirror element 30 at the first reflection position. The reflected light passes through the projection optical member 28 and travels forward of the lamp to be radiated toward each individual region R corresponding to each mirror element 30. Accordingly, the light distribution pattern having a predetermined shape is formed forward of the lamp.

The imaging unit 12 takes an image in front of the own vehicle to generate image information. The imaging unit 12 includes the high speed camera 36 and a low speed camera 38. The high speed camera 36 has a relatively high frame rate, for example, 200 fps to 10,000 fps (0.1 ms to 5 ms per frame). On the other hand, the low speed camera 38 has a relatively low frame rate, for example, 30 fps to 120 fps (approximately 8 ms to 33 ms per frame). The high speed camera 36 has relatively small resolution, for example, 300,000 pixels or more and smaller than 5,000,000 pixels. On the other hand, the low speed camera 38 has relatively large resolution, for example, 5,000,000 pixels or more. The high speed camera 36 and the low speed camera 38 take images of all the individual regions R. The resolution of the high speed camera 36 and the low speed camera 38 is not limited to the above-described numerical value and can be set to any value within a technically appropriate range.

The control device 50 includes an imaging control unit 52, a luminance analysis unit 14, a target analysis unit 16, a lamp control unit 18 and a light source control unit 20. Each unit operates by executing a program stored in a memory by an integrated circuit. Basic operation of each unit of the control device 50 will be described below.

The imaging control unit 52 controls an operation of the imaging unit 12. For example, the imaging control unit 52 transmits a signal for instructing generation of the image information (hereinafter referred to as an instruction signal) to the imaging unit 12 while measuring passage of time using a timer (not shown). In the present embodiment, the imaging control unit 52 controls the generation of the image information by the high speed camera 36. The low speed camera 38 repeats the generation of the image information at a predetermined frame rate regardless of transmission and reception of the instruction signal from the imaging control unit 52. The imaging control unit 52 transmits a synchronization signal for synchronizing the generation of the image information by the imaging unit 12 and control of the light source unit 10 by the light source control unit 20 to the light source control unit 20.

The image information generated by the imaging unit 12 is sent to the luminance analysis unit 14 and the target analysis unit 16. The luminance analysis unit 14 detects luminance of each individual region R based on the image information obtained from the imaging unit 12. The luminance analysis unit 14 is a high speed and low accuracy analysis unit which performs image analysis with accuracy lower than that of the target analysis unit 16 and outputs an analysis result at high speed. The luminance analysis unit 14 according to the present embodiment detects the luminance of each individual region R based on the image information obtained from the high speed camera 36. The luminance analysis unit 14 detects the luminance of each individual region R each time the image information is obtained from the high speed camera 36. The luminance analysis unit 14 can detect the luminance, for example, every 0.1 ms to 5 ms.

The luminance analysis unit 14 according to the present embodiment binarizes the luminance in each of the plurality of individual regions R. The luminance analysis unit 14 stores a predetermined luminance threshold value in a memory, converts the luminance equal to or higher than the threshold value to a predetermined high luminance value, and converts the luminance less than the threshold value to a predetermined low luminance value. As a result, the plurality of individual regions R are divided into two, i.e. individual regions R having relatively high luminance and individual regions R having relatively low luminance. A detection result of the luminance analysis unit 14, that is, a signal indicating luminance information of each individual region R is transmitted to the lamp control unit 18.

The target analysis unit 16 detects a predetermined target present in front of the own vehicle based on the image information obtained from the imaging unit 12. The target analysis unit 16 is a low speed and high accuracy analysis unit which performs image analysis with accuracy higher than that of the luminance analysis unit 14 and outputs an analysis result at low speed. The target analysis unit 16 according to the present embodiment detects the target based on information obtained from the low speed camera 38. The target analysis unit 16 can detect the target, for example, every 50 ms. The target detected by the target analysis unit 16 is, for example, a self-luminous body, and specific examples thereof include an oncoming vehicle 100 shown in FIG. 3, a preceding vehicle (not shown) and the like. Hereinafter, the oncoming vehicle 100 will be described as an example of the target, but the same processing is also executed on the preceding vehicle.

The target analysis unit 16 can detect the target using known methods including algorithm recognition, deep learning and the like. For example, the target analysis unit 16 stores feature points indicating the oncoming vehicle 100 in advance. When imaging data of the low speed camera 38 includes data including the feature points indicating the oncoming vehicle 100, the target analysis unit 16 recognizes a position of the oncoming vehicle 100. The "feature points indicating the oncoming vehicle 100" are, for example, light spots 102 (see FIG. 3) having a predetermined luminosity or higher which appear in an estimated presence region of headlamps of the oncoming vehicle 100. A detection result of the target analysis unit 16, that is, a signal indicating target information in front of the own vehicle is transmitted to the lamp control unit 18.

The lamp control unit 18 performs displacement detection on the target, setting of a specific individual region R1, setting of an illuminance value of the light to be radiated to each individual region R, and the like based on detection results of the luminance analysis unit 14 and/or the target analysis unit 16. As an example, the lamp control unit 18 includes a tracking unit 40 and an illuminance setting unit 42. The tracking unit 40 detects a displacement of the predetermined target detected by the target analysis unit 16 based on the detection result of the luminance analysis unit 14.

Specifically, the tracking unit 40 integrates the detection result of the luminance analysis unit 14 and the detection result of the target analysis unit 16 before binarization processing is executed. Among luminance of the individual regions R detected by the luminance analysis unit 14, the luminance of the individual region R where the light spot 102 of the oncoming vehicle 100 as the target is located is associated with the oncoming vehicle 100. The tracking unit 40 can detect the displacement of the oncoming vehicle 100 as the target by recognizing a position of the luminance associated with the oncoming vehicle 100 in the detection result of the luminance analysis unit 14 obtained thereafter. The tracking unit 40 executes a specific target determination processing, for example, every 50 ms. In addition, the tracking unit 40 executes displacement detection processing (tracking) on a specific target, for example, every 0.1 ms to 5 ms.

The illuminance setting unit 42 determines the illuminance value of the light to be radiated to each individual region R based on the detection result of the luminance analysis unit 14 and the detection result of the tracking unit 40 so as to determine a light distribution pattern to be formed. First, the illuminance setting unit 42 determines the specific individual region R1 (see FIG. 3) according to a position where the target is present. When the target is the oncoming vehicle 100, the illuminance setting unit 42 determines the specific individual region R1 based on position information of the oncoming vehicle 100 included in the detection result of the tracking unit 40.

For the setting of the specific individual region R1, for example, the illuminance setting unit 42 determines a vertical distance b of a predetermined ratio with respect to a horizontal distance a between two light spots 102 corresponding to the headlamps of the oncoming vehicle 100, and sets the individual region R overlapping a dimension range of the horizontal a×vertical b as the specific individual region R1. The specific individual region R1 includes the individual region R overlapping a driver of the oncoming vehicle 100.

Then, the illuminance setting unit 42 determines the illuminance value of the light to be radiated to each individual region R including the specific individual region R1. Specifically, among the individual regions R excluding the specific individual region R1, for an individual region R whose luminance is within a predetermined high luminance range, the illuminance setting unit 42 sets an illuminance value such that a luminance of the individual region R decreases due to formation of a light distribution pattern, and for an individual region R whose luminance is within a predetermined low luminance range, the illuminance setting unit 42 sets an illuminance value such that a luminance of the individual region R increases due to formation of a light distribution pattern. The predetermined high luminance range and the predetermined low-luminance range can be appropriately set based on results of experiments and simulations in consideration of visibility of a driver of the own vehicle.

The illuminance setting unit 42 according to the present embodiment sets a first illuminance value for the individual region R having a relatively high luminance and sets a second illuminance value higher than the first illuminance value for the individual region R having a relatively low luminance, in the detection result (binarized luminance information) of the luminance analysis unit 14 subjected to the binarization processing. For example, when the illuminance value includes 256 gradations from 0 to 255, the first illuminance value is "0" and the second illuminance value is "255".

The illuminance setting unit 42 may set the illuminance value for each individual region R based on the detection result of the luminance analysis unit 14 not subjected to the binarization processing. In this case, for example, the illuminance setting unit 42 stores a predetermined target luminance value in the memory for each individual region R excluding the specific individual region R1. Then, the illuminance setting unit 42 sets the illuminance value for each individual region R such that the luminance detected by the luminance analysis unit 14 approaches the target luminance value due to a subsequent formation of the light distribution pattern. For example, the target luminance value for each individual region R is set to the same value. The illuminance setting unit 42 may set the target luminance value for each individual region R to be different.

The illuminance setting unit 42 determines a specific illuminance value for the specific individual region R1. When the target is the oncoming vehicle 100, the illuminance setting unit 42 sets, for example, the specific illuminance value "0" for the specific individual region R1. That is, the illuminance setting unit 42 determines a light distribution pattern which shields the specific individual region R1. The illuminance setting unit 42 recognizes a displacement of the specific individual region R1 based on the detection result of the tracking unit 40, and updates position information of the specific individual region R1. Then, the illuminance value for each individual region R including the specific illuminance value for the specific individual region R1 is updated. Processing by the tracking unit 40 and processing by the illuminance setting unit 42 are executed at least temporarily in parallel.

The illuminance setting unit 42 transmits a signal indicating the illuminance value for each individual region R including the specific illuminance value for the specific individual region R1 to the light source control unit 20. The illuminance setting unit 42 can set the illuminance value, for example, every 0.1 ms to 5 ms.

The light source control unit 20 controls the light source unit 10 based on the illuminance value determined by the illuminance setting unit 42. The light source control unit 20 receives a synchronization signal from the imaging control unit 52 and controls the light source unit 10. The light source control unit 20 controls turning on and off of the light source 22 and on and off switching of each mirror element 30. The light source control unit 20 adjusts an on time ratio (a width and a density) of each mirror element 30 based on the illuminance value of the light to be radiated to each individual region R. Accordingly, the illuminance of the light to be radiated to each individual region R can be adjusted. The light source control unit 20 can transmit a drive signal to the light source 22 and/or the light deflection device 26, for example, every 0.1 ms to 5 ms.

The light is emitted from the light source unit 10 based on the illuminance value determined by the illuminance setting unit 42, and as a result, the actual luminance value for each individual region R is detected by the luminance analysis unit 14. Then, the illuminance setting unit 42 sets the illuminance value again based on the detection result.

With the above-described configuration, the vehicle lamp system 1 can form a light distribution pattern configured by gathering a plurality of partial irradiation regions. Each of the plurality of partial irradiation regions is formed when the corresponding mirror element 30 is on. The vehicle lamp system 1 can form light distribution patterns of various shapes by switching each mirror element 30 on and off.

Adaptive driving beam (ADB) control performed by the vehicle lamp system 1 according to the present embodiment will be described below. The vehicle lamp system 1 performs the ADB control for forming an optimal light distribution pattern according to the position of the target in front of the own vehicle.

Under ADB control, the imaging control unit 52 controls the high speed camera 36 of the imaging unit 12 to perform a combination of a first operation of generating image information with a first time period and a second operation of generating image information with a second time period having a length different from the first time period. For example, the second time period is longer than the first time period.

The imaging control unit 52 according to the present embodiment controls the high speed camera 36 of the imaging unit 12 to alternately repeat the first operation and the second operation. For example, the imaging control unit 52 transmits a first instruction signal after the first time period has elapsed since a start of imaging by the high speed camera 36. Upon receiving the first instruction signal, the high speed camera 36 generates image information based on an imaging result by then. Accordingly, the first operation is completed.

Subsequently, the imaging control unit 52 transmits a second instruction signal after the second time period has elapsed since transmission of the first instruction signal. Upon receiving the second instruction signal, the high speed camera 36 generates image information based on an imaging result from reception of the first instruction signal to reception of the second instruction signal. Accordingly, the second operation is completed.

Subsequently, the imaging control unit 52 transmits a third instruction signal after the first time period has elapsed since transmission of the second instruction signal. Upon receiving the third instruction signal, the high speed camera 36 generates image information based on an imaging result from the reception of the second instruction signal to reception of the third instruction signal. Accordingly, the first operation is completed. Thereafter, this procedure is repeated, and the first operation and the second operation are alternately repeated by the high speed camera 36.

The light source control unit 20 controls the light source unit 10 to form a reference light distribution pattern at a predetermined timing. The reference light distribution pattern is independent of the illuminance value determined by the illuminance setting unit 42 and has substantially the same illuminance as a whole. The reference light distribution pattern is, for example, a known low beam light distribution pattern or high beam light distribution pattern. The imaging control unit 52 controls the high speed camera 36 of the imaging unit 12 to perform the first operation under formation of the reference light distribution pattern.

The predetermined timing is, for example, a timing at which the ADB control is started to first form a light distribution pattern. That is, when the ADB control is started, first, the light source control unit 20 controls the light source unit 10 to form the reference light distribution pattern. In addition, the imaging by the imaging unit 12 is started. Then, the imaging control unit 52 controls the high speed camera 36 to first perform the first operation. That is, the imaging control unit 52 transmits the first instruction signal after the first time period has elapsed since the start of the imaging. First image information is generated by the first operation of the high speed camera 36. Therefore, the first image information is related to a state where the reference light distribution pattern is formed.

The luminance analysis unit 14 detects the luminance of each individual region R based on the first image information and binarizes the luminance of each individual region R. In the first image information, the light spot 102 of the oncoming vehicle 100 is detected as a high luminance body. In addition, under the formation of the reference light distribution pattern, the light is also applied to a reflective object having a high reflectance. Therefore, the reflective object is also detected as a high luminance body. Hereinafter, a road sign 106 (see FIG. 3) present in front of the vehicle will be described as an example of a reflective object, and the same processing is also executed on other reflective objects such as a visual line guide (a delineator) and a signboard.

The target analysis unit 16 detects the oncoming vehicle 100 as the predetermined target based on the light spot 102 included in the image information generated by the low speed camera 38 under the formation of the reference light distribution pattern. The tracking unit 40 integrates the detection result of the luminance analysis unit 14 and the detection result of the target analysis unit 16, and detects the displacement of the oncoming vehicle 100 based on the luminance of the individual region R corresponding to the light spot 102.

The illuminance setting unit 42 sets the specific individual region R1 based on the detection result of the luminance analysis unit 14 and the detection result of the tracking unit 40, and determines the illuminance value for each individual region R including the specific illuminance value for the specific individual region R1. As a result, a first light distribution pattern to be formed is determined. In the binarized luminance information generated by the luminance analysis unit 14, the individual region R corresponding to the road sign 106 has the predetermined high luminance value, and other individual regions R (excluding the specific individual region R1) have the predetermined low luminance value. Therefore, in the first light distribution pattern, the first illuminance value "0" is determined for the individual region R corresponding to the road sign 106, and the second illuminance value "255" is determined for other individual regions R (excluding the specific individual region R1). The specific illuminance value "0" is determined for the specific individual region R1. Then, the light source control unit 20 controls the light source unit 10 to form the determined first light distribution pattern.

Subsequently, the imaging control unit 52 controls the high speed camera 36 to perform the second operation. That is, the imaging control unit 52 transmits the second instruction signal after the second time period has elapsed since the transmission of the first instruction signal. In the vehicle lamp system 1 according to the present embodiment, the first light distribution pattern can be formed substantially simultaneously with the transmission of the first instruction signal. Therefore, the second operation is substantially performed under the formation of the first light distribution pattern in which the illuminance value for the individual region R corresponding to the road sign 106 is set to the first illuminance value "0".

Since the road sign 106 is not a self-luminous body, the road sign 106 does not emit (reflect) light under the formation of the first light distribution pattern. Therefore, in second image information generated by the second operation of the high speed camera 36, the road sign 106 is detected as a low luminance body. Therefore, in the binarized luminance information generated by the luminance analysis unit 14 based on the second image information, the individual region R corresponding to the road sign 106 has the predetermined low luminance value similarly to that of other individual regions R (excluding the specific individual region R1).

The illuminance setting unit 42 sets the specific individual region R1 based on the detection result of the luminance analysis unit 14 and the detection result of the tracking unit 40, and determines the second light distribution pattern to be formed. In the second light distribution pattern, the second illuminance value "255" is determined for the individual regions R (including the individual region R corresponding to the road sign 106) excluding the specific individual region R1. The specific illuminance value "0" is determined for the specific individual region R1. Therefore, under formation of the second light distribution pattern, the road sign 106 is irradiated with the light. Then, the first operation is performed by the high speed camera 36 under the formation of the second light distribution pattern.

Therefore, under the ADB control according to the present embodiment, after the first light distribution pattern is formed for the second time period, the second light distribution pattern is formed for the first time period. Then, the formation of the first light distribution pattern and the formation of the second light distribution pattern are alternately repeated. That is, the first light distribution pattern is formed by one of even frames and odd frames in image generation of the high speed camera 36, and the second light distribution pattern is formed by the other frames.

Figure 4A:
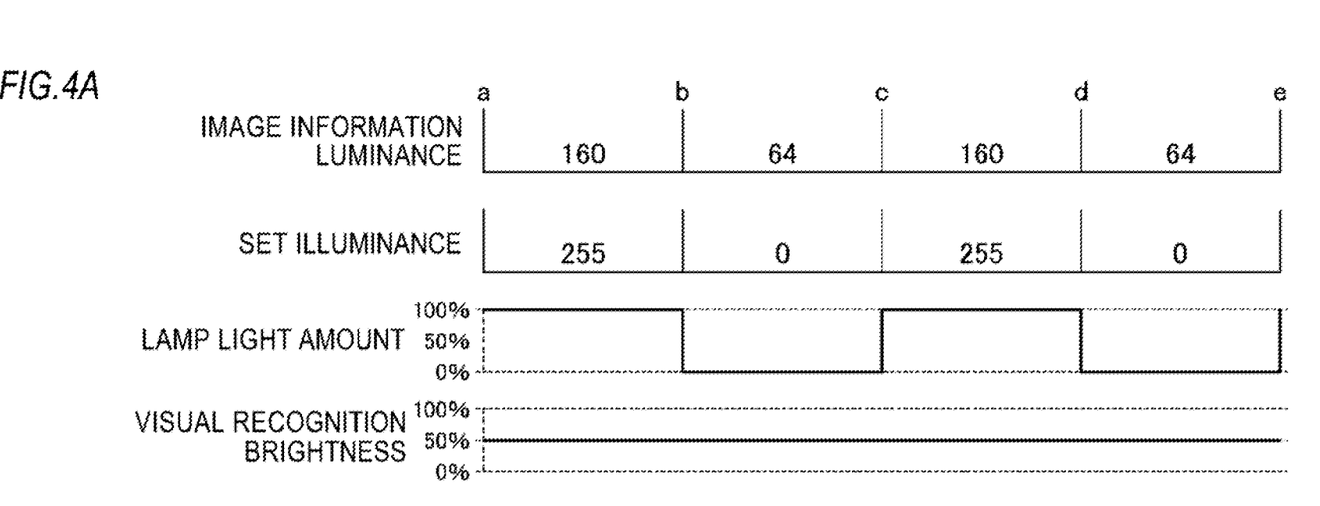
FIG. 4A is a diagram showing brightness of a reflective object under ADB control according to a reference example.
Figure 4B:
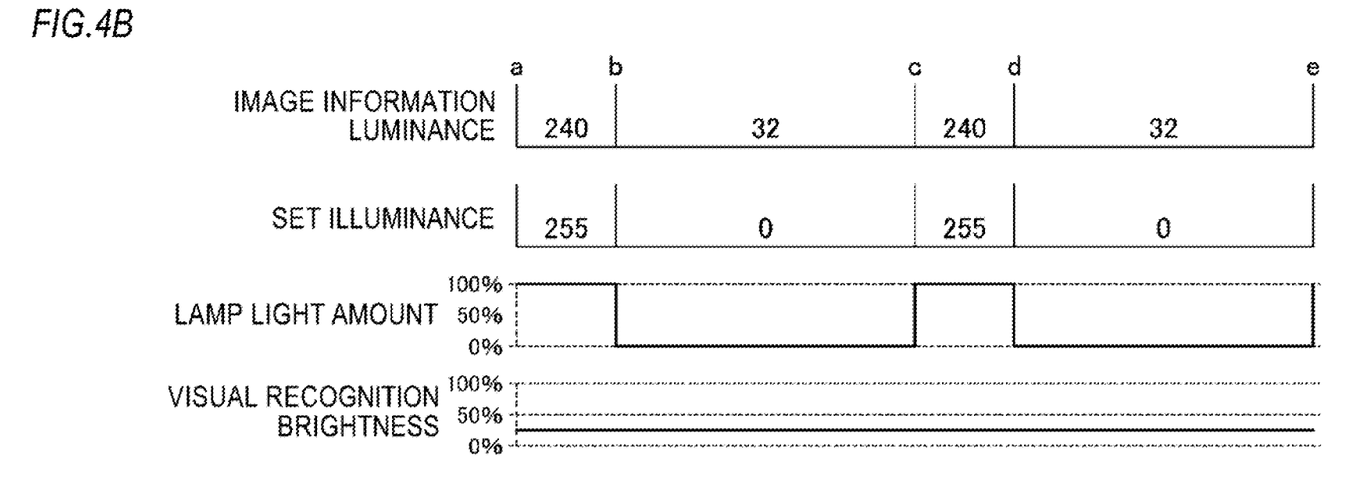
FIG. 4B is a diagram showing brightness of a reflective object under ADB control according to the embodiment.

FIG. 4A is a diagram showing brightness of a reflective object under ADB control according to a reference example. FIG. 4B is a diagram showing brightness of the reflective object under the ADB control according to the embodiment. In FIGS. 4A and 4B, the first stage from the top indicates transition of luminance of the reflective object in image information generated by the high speed camera 36. Numerals are examples of luminance values in a case where the luminance includes 256 gradations. The second stage from the top indicates transition of illuminance of the individual region R corresponding to the reflective object set by the illuminance setting unit 42. Numerals are examples of illuminance values when the illuminance includes 256 gradations. In the example described here, the luminance analysis unit 14 binarizes the luminance of each individual region R using a luminance threshold value "128".

In FIGS. 4A and 4B, the third stage from the top indicates transition of an amount of light emitted from the light source unit 10 toward the individual region R corresponding to the reflective object. The amount of light is expressed as a ratio in a case where a maximum value of the amount of light which can be emitted by the light source unit 10 is 100%. The lowermost stage indicates transition of brightness of the reflective object visually recognized by the driver of the own vehicle. The brightness of the reflective object is expressed as a ratio in a case where the brightness of the reflective object when the amount of light emitted from the light source unit 10 is maximum is 100%.

In FIGS. 4A and 4B, a second light distribution pattern for radiating light to the reflective object is formed from time a to time b and from time c to time d. In addition, a first light distribution pattern for shielding the reflective object is formed from the time b to the time c and from the time d to time e.

As shown in FIG. 4A, under the ADB control according to the reference example, the high speed camera 36 repeatedly generates the image information at a constant frame rate. Therefore, formation of the first light distribution pattern and formation of the second light distribution pattern are alternately repeated at the same time period. Therefore, light radiation of an illuminance value "255" and light shielding with respect to the reflective object are alternately repeated at the same time period. Therefore, the driver visually recognizes the reflective object at an average brightness of the reflective object when irradiated with light having the illuminance value "255" and when shielded, that is, at a brightness of 50% when output of the light source unit 10 is maximum.

In recent years, as luminance of vehicle lamps is increasing, intensity of light reflected by a reflective object tends to increase. Therefore, even if brightness of the reflective object is suppressed to 50% at maximum, a driver of an own vehicle may experience glare. However, under the ADB control according to the reference example, the brightness of the reflective object is fixed at 50% and cannot be adjusted.

In contrast, as shown in FIG. 4B, under the ADB control according to the present embodiment, a first operation of generating image information with a first time period and a second operation of generating image information with a second time period by the high speed camera 36 are performed in combination. Accordingly, a time period during which the reflective object is irradiated with the light having the illuminance value "255" and a time period during which the reflective object is shielded can be made different from each other. In the example shown in FIG. 4B, a formation time period of the first light distribution pattern for shielding the reflective object is three times (for example, 3 ms) as long as a formation time period (for example, 1 ms) of the second light distribution pattern for radiating light to the reflective object. Therefore, the reflective object is visually recognized at a brightness of 25% when the output of the light source unit 10 is maximum. By changing a length between the first time period of performing the first operation and the second time period for performing the second operation, degree of reduction in the brightness of the reflective object visually recognized can be freely adjusted.

Figure 5A:
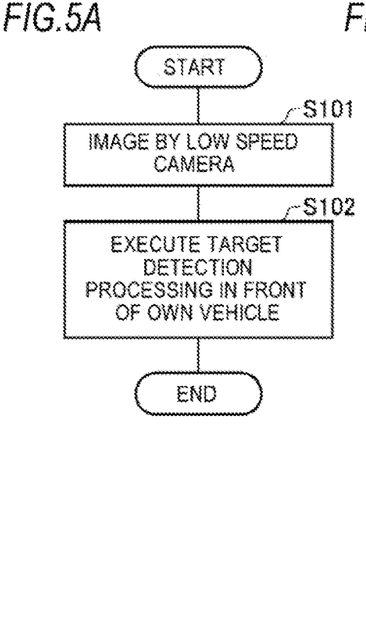
FIGS. 5A and 5B are flowcharts showing an example of the ADB control performed in the vehicle lamp system according to the embodiment.
Figure 5B:
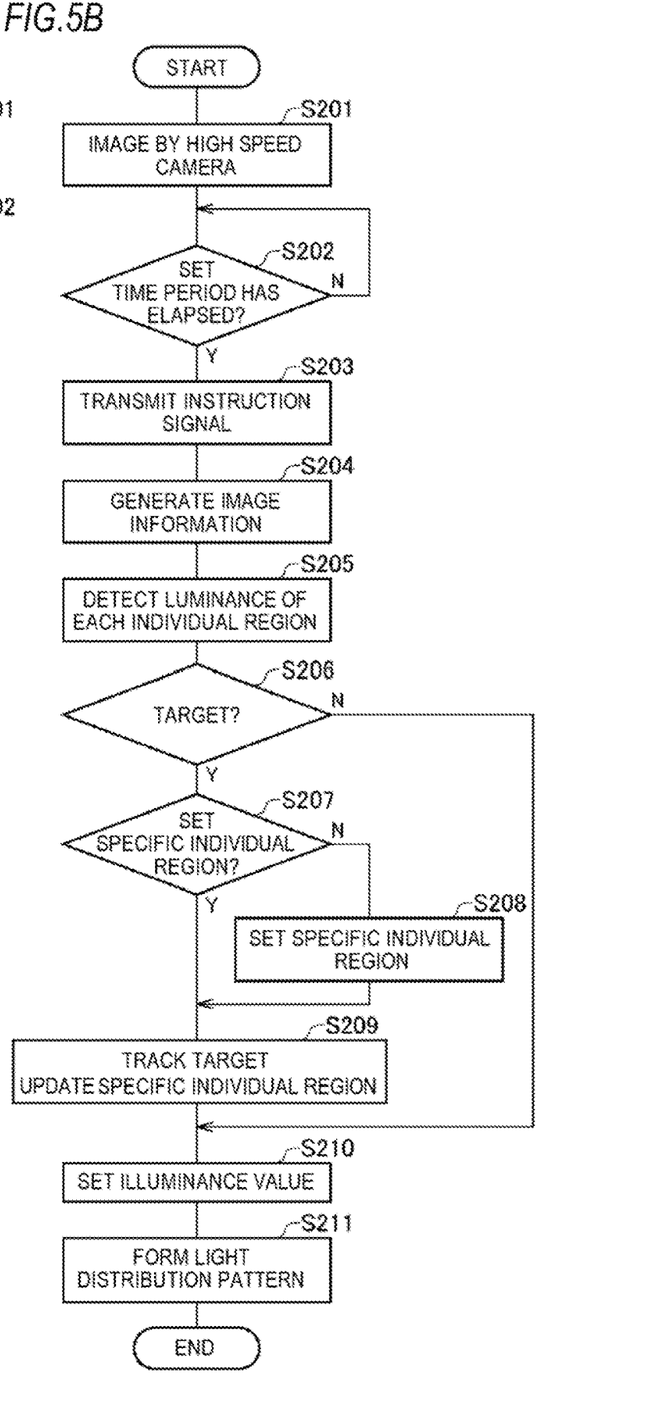

FIGS. 5A and 5B are flowcharts showing an example of the ADB control performed in the vehicle lamp system 1 according to the embodiment. For example, this flow is repeatedly executed at a predetermined timing when an ADB control instruction is issued by a light switch (not shown) and an ignition is turned on, and ends when the ADB control instruction is canceled (or a stop instruction is issued) or the ignition is turned off. A first flow shown in FIG. 5A and a second flow shown in FIG. 5B are executed in parallel.

In the first flow as shown in FIG. 5A, first, an image in front of the own vehicle is taken by the low speed camera 38 (S101). Next, the target analysis unit 16 executes target detection processing in front of the own vehicle based on image information obtained from the low speed camera 38 (S102). When a target is detected, the target analysis unit 16 generates information indicating a presence of the target (hereinafter referred to as target information) and stores the information in a memory, and this routine ends.

In the second flow as shown in FIG. 5B, first, an image in front of the own vehicle is taken by the high speed camera 36 (S201). Next, the imaging control unit 52 determines whether a set time period has elapsed (S202). The set time period is a second time period when there was a first time period in the previous routine, and is a first time period when there was a second time period in the previous routine. Time setting is performed by the imaging control unit 52. When the set time period has not elapsed (N in S202), the imaging control unit 52 repeats the determination in step 202. When the set time period has elapsed (Y in S202), an instruction signal is transmitted from the imaging control unit 52 to the high speed camera 36 (S203).

Upon receiving the instruction signal, the high speed camera 36 generates image information (S204). Then, the luminance analysis unit 14 detects luminance of each individual region R based on the image information generated by the high speed camera 36 (S205). Subsequently, the tracking unit 40 determines whether the target in front of the own vehicle is detected in the first flow (S206). The tracking unit 40 can determine presence or absence of the target based on presence or absence of the target information. When the target is detected (Y in S206), the tracking unit 40 determines whether a specific individual region R1 is set (S207).

When the specific individual region R1 is set (Y in S207), the tracking unit 40 tracks the target and detects a position (a displacement) of the specific individual region R1 (S209). In addition, the illuminance setting unit 42 updates setting (position information) of the specific individual region R1 based on the detection result of the tracking unit 40 (S209). When the specific individual region R1 is not set (N in S207), the illuminance setting unit 42 sets the specific individual region R1 based on a position of the target (S208). Thereafter, the processing of step S209 is executed.

Subsequently, the illuminance setting unit 42 sets an illuminance value for each individual region R (S210). The illuminance setting unit 42 sets a specific illuminance value for the specific individual region R1. Then, the light source control unit 20 controls the light source unit 10 to emit light having the illuminance value set by the illuminance setting unit 42. Accordingly, a light distribution pattern is formed in front of the vehicle (S211), and the present routine ends.

When the target is not detected (N in S206), the illuminance setting unit 42 sets the illuminance value for each individual region R (S210). In this case, the specific illuminance value is not included in the set illuminance value. Thereafter, the processing of step S211 is executed, and the present routine ends. In step S209, when disappearance of the target is detected by tracking, the setting of the specific individual region R1 also disappears. Therefore, the specific illuminance value is not included in the illuminance value set in step S210. In step S206 in the next routine, it is determined that the target is not detected until the target information is generated in the processing of step S102 (N in S206).

As described above, the vehicle lamp system 1 according to the present embodiment includes the imaging unit 12, the imaging control unit 52, the luminance analysis unit 14, the illuminance setting unit 42, the light source unit 10 and the light source control unit 20. The imaging unit 12 takes an image in front of the own vehicle to generate the image information. The imaging control unit 52 controls the imaging unit 12 to perform the combination of the first operation of generating the image information with the first time period and the second operation of generating the image information with the second time period having a length different from the first time period. The luminance analysis unit 14 detects the luminance of each of the plurality of individual regions R arranged in front of the own vehicle based on the image information obtained from the imaging unit 12. The illuminance setting unit 42 determines the illuminance value of the light to be radiated to each individual region R based on the detection result of the luminance analysis unit 14 so as to determine the light distribution pattern to be formed.

Specifically, for an individual region R whose luminance is within a predetermined high luminance range, the illuminance setting unit 42 sets an illuminance value such that a luminance of the individual region R decreases due to formation of the light distribution pattern, and for an individual region R whose luminance is within a predetermined low luminance range, the illuminance setting unit 42 sets an illuminance value such that a luminance of the individual region R increases due to formation of the light distribution pattern. The light source unit 10 is capable of independently adjusting the illuminance of the light to be radiated to each of the plurality of individual regions R. The light source control unit 20 controls the light source unit 10 to form the light distribution pattern determined by the illuminance setting unit 42.

In the present embodiment, the light source control unit 20 controls the light source unit 10 so as to form the reference light distribution pattern independent of the illuminance value determined by the illuminance setting unit 42 at the predetermined timing. The second time period is set to be longer than the first time period, and the imaging control unit 52 controls the imaging unit 12 to perform the first operation under the formation of the reference light distribution pattern. Therefore, in the present embodiment, the first light distribution pattern for shielding the reflective object is formed for the relatively long second time period, and the second light distribution pattern for radiating light to the reflection object is formed for the relatively short first time period.

Since the reflective object is not a self-luminous body, when a light distribution pattern determined by setting a low illuminance value for the individual region R having high luminance and setting a high illuminance value for the individual region R having low luminance is formed, light radiation and light shielding are alternately repeated on the reflective object. Since this switching is fast, the driver of the own vehicle visually recognizes the reflective object at brightness obtained by averaging brightness during the light radiation and brightness during light shielding.

In the present embodiment, the imaging unit 12 combines the first operation of generating the image information with the first time period and the second operation of generating the image information with the second time period. Therefore, the first light distribution pattern for shielding the reflective object is formed in the second time period longer than the first time period, and the second light distribution pattern for radiating light to the reflective object is formed in the first time period shorter than the second time period. Therefore, the brightness of the reflective object can be reduced as compared with a case where the first light distribution pattern and the second light distribution pattern are combined in the same formation time period. In addition, by adjusting a difference in length between the first time period and the second time period, the degree of reduction in the brightness of the reflective object visually recognized by the driver can be freely adjusted.

Accordingly, even when the light source unit 10 mounted on the vehicle lamp 2 of the own vehicle forms a high luminance, the brightness of the reflective object can be further reduced by making the second time period longer than the first time period. Therefore, according to the present embodiment, the glare experienced by the driver due to the light reflected from the reflective object can be reduced, and the visibility of the driver can be improved.

The imaging control unit 52 according to the present embodiment controls the imaging unit 12 to alternately repeat the first operation and the second operation. Therefore, in the present embodiment, the formation of the first light distribution pattern for the first time period and the formation of the second light distribution pattern for the second time period are alternately repeated. Accordingly, degree of freedom in setting the brightness of the reflective object can be increased while complication of control can be suppressed.

The luminance analysis unit 14 according to the present embodiment binarizes the luminance in each of the plurality of individual regions R. The illuminance setting unit 42 sets the first illuminance value for the individual region R having the relatively high luminance and sets the second illuminance value higher than the first illuminance value for the individual region R having the relatively low luminance. Accordingly, the ADB control can be further simplified, and a load applied to the vehicle lamp system 1 can be reduced.

The vehicle lamp system 1 according to the present embodiment includes the target analysis unit 16 which detects the predetermined target in front of the own vehicle based on the information obtained from the imaging unit 12, and the tracking unit 40 which detects the displacement of the predetermined target detected by the target analysis unit 16 based on the detection result of the luminance analysis unit 14. The illuminance setting unit 42 determines the specific illuminance value for the specific individual region R1 determined according to the position of the target based on the detection result of the tracking unit 40.

Since a relatively long image processing is required to detect the predetermined target, the target analysis unit 16 is inferior in analysis speed. Therefore, when the ADB control is performed based on only the analysis result of the target analysis unit 16, the light distribution pattern can be formed to improve the visibility of the driver of the own vehicle by narrowing a light shielding region with respect to the target such as the oncoming vehicle 100 or the preceding vehicle. However, the light shielding region is less likely to accurately follow the displacement of the target. On the other hand, the luminance analysis unit 14 which performs simple luminance detection can perform high speed analysis since time period required for image processing is relatively short. However, since detection accuracy of the target is low, the position of the target is less likely to be accurately grasped. Therefore, when the ADB control is performed based on only the analysis result of the luminance analysis unit 14, the light shielding region of the light distribution pattern is required to be set wider, and the visibility of the vehicle driver is sacrificed.

In contrast, in the vehicle lamp system 1 according to the present embodiment, the light distribution pattern is determined by accurately grasping the position of the target by combining the target analysis unit 16 serving as a low-speed but advanced image analysis unit, and the luminance analysis unit 14 serving as a simple but high speed image analysis unit. Therefore, light radiation accuracy of the vehicle lamp 2, in other words, formation accuracy of the light distribution pattern can be improved. As a result, both the reduction of glare given to the driver of the oncoming vehicle 100 or the preceding vehicle and ensuring the visibility of the driver of the own vehicle can be both achieved at a higher level.

The embodiment of the present invention has been described above in detail. The above-described embodiment is merely a specific example for carrying out the present invention. The contents of the embodiment do not limit the technical scope of the present invention, and various design modification such as change, addition, deletion of constituent elements may be made without departing from the inventive concept defined in the claims. New embodiments to which design modifications have been made have the effects of the combined embodiments and modifications. In the above-described embodiment, the contents which can be design-modified as described above are emphasized with notations such as "the present embodiment" and "in the present embodiment", and design modifications are allowed even for the contents without these notations. Any combination of the above components is effective as an aspect of the present invention. The hatching in the cross section of the drawing is not intended to limit the material of the hatched target.

In the embodiment, the imaging control unit 52 controls the imaging unit 12 to perform the first operation under the formation of the reference light distribution pattern. Accordingly, during the second operation following the first operation, the first light distribution pattern for shielding the reflective object is formed, and during the first operation following the second operation, the second light distribution pattern for radiating light to the reflective object is formed. Since the first operation is shorter than the second operation, the total time period during which the reflective object is irradiated with the light under the ADB control can be shortened, and the brightness of the reflective object visually recognized by the driver can be reduced.

On the other hand, for example, when the luminance of the light source mounted on the vehicle lamp 2 is low, the brightness of the reflective object may be desired to be increased. In this case, the imaging control unit 52 controls the imaging unit 12 to perform the second operation under the formation of the reference light distribution pattern. Accordingly, during the first operation following the second operation, the first light distribution pattern for shielding the reflective object is formed, and during the second operation following the first operation, the second light distribution pattern for radiating light to the reflective object is formed. Since the first operation is shorter than the second operation, the total time during which the reflective object is irradiated with the light under the ADB control can be lengthened, and the brightness of the reflective object visually recognized by the driver can be increased.

Whether the operation performed by the imaging unit 12 under the formation of the reference light distribution pattern is the first operation or the second operation can be set in advance in an operation program of the imaging control unit 52 according to a specification of the light source in the vehicle on which the vehicle lamp system 1 is mounted, for example. In addition, lengths of the first time period and the second time period can be set in advance according to the specification of the light source.

Although the first operation and the second operation are alternately performed in the embodiment, the first operation and the second operation may not be alternately performed. Even in this case, since the first light distribution pattern and the second light distribution pattern are formed by the combination of the first operation and the second operation, the brightness of the reflective object can be changed. Not only the first operation and the second operation, but also a third or more operations having different time period with these operations may be further combined.

In the embodiment, the imaging unit 12 and the control device 50 are provided in the lamp chamber 8, but the imaging unit 12 and the control device 50 may be provided outside the lamp chamber 8 as appropriate. The imaging unit 12 and the light source unit 10 are desired to have a matching angle of view. The imaging control unit 52 may be provided in the imaging unit 12. When the high speed camera 36 has resolution the same as that of the low speed camera 38, the low speed camera 38 may be omitted. Accordingly, a size of the vehicle lamp system 1 can be reduced. In this case, the target analysis unit 16 detects the target using image data of the high speed camera 36.

The light source unit 10 may include a scanning optical system configured to scan the front side of the own vehicle with light source light or an LED array in which LEDs corresponding to the individual regions R are arranged, instead of the light deflection device 26 serving as the DMD. When angles of view of the high speed camera 36 and the low speed camera 38 are larger than a light radiation range of the light source unit 10, an imaging range and the light radiation range may be matched by trimming or scaling the image information according to the light radiation range of the light source unit 10.

The following aspects can be also within the inventive concept of the present invention.

A control device (50) for a vehicle lamp (2) includes: an imaging control unit (52) configured to control an imaging unit (12) which is configured to take an image in front of an own vehicle to generate image information, so as to perform a combination of a first operation of generating image information with a first time period and a second operation of generating image information with a second time period having a length different from the first time period; a luminance analysis unit (14) configured to detect luminance of each of a plurality of individual regions (R) arranged in front of the own vehicle based on the image information obtained from the imaging unit (12); an illuminance setting unit (42) configured to determine an illuminance value of light to be radiated to each individual region (R) based on a detection result of the luminance analysis unit (14) so as to determine a light distribution pattern to be formed, the illuminance setting unit (42) being configured to: for an individual region (R) whose luminance is within a predetermined high luminance range, set an illuminance value such that luminance of the individual region (R) decreases due to formation of the light distribution pattern; and for an individual region (R) whose luminance is within a predetermined low luminance range, set an illuminance value such that luminance of the individual region (R) increases due to formation of the light distribution pattern; and a light source control unit (20) configured to control a light source unit (10) which is configured to independently adjust illuminance of the light to be radiated to each of the plurality of individual regions (R), so as to form the light distribution pattern.

A control method for a vehicle lamp (2) includes: controlling an imaging unit (12) configured to take an image in front of an own vehicle to generate image information, so as to perform a combination of a first operation of generating image information with a first time period and a second operation of generating image information with a second time period having a length different from the first time period; detecting luminance of each of a plurality of individual regions (R) arranged in front of the own vehicle based on the image information obtained from the imaging unit (12); determining an illuminance value of light to be radiated to each individual region (R) based on the detected luminance so as to determine a light distribution pattern to be formed, the determining including: for an individual region (R) whose luminance is within a predetermined high luminance range, setting an illuminance value such that luminance of the individual region (R) decreases due to formation of the light distribution pattern; and for an individual region (R) whose luminance is within a predetermined low luminance range, setting an illuminance value such that luminance of the individual region (R) increases due to formation of the light distribution pattern; and controlling a light source unit (10) configured to independently adjust illuminance of the light to be radiated to each of the plurality of individual regions (R), so as to form the light distribution pattern.

The invention claimed is:

1. A vehicle lamp system comprising:
an imaging unit configured to take an image in front of a vehicle driven by a user to generate image information;
a processor, configured to:
perform a combination of a first operation of generating image information with a first time period and a second operation of generating image information with a second time period having a length different from the first time period;
detect luminance of each of a plurality of individual regions arranged in front of the vehicle based on the image information obtained from the imaging unit;
determine an illuminance value of light to be radiated to each individual region based on a detection result, so as to determine a light distribution pattern to be formed, wherein the processor is further configured to:
for an individual region whose luminance is within a predetermined high luminance range, set an illuminance value such that luminance of the individual region decreases due to formation of the light distribution pattern; and
for an individual region whose luminance is within a predetermined low luminance range, set an illuminance value such that luminance of the individual region increases due to formation of the light distribution pattern;
independently adjust illuminance of the light to be radiated to each of the plurality of individual regions;
form the light distribution pattern; and
form a first light distribution pattern based on a first image information generated in the first operation, and form a second light distribution pattern based on a second image information generated in the second operation, and
perform the second operation under formation of the first light distribution pattern, and perform the first operation under formation of the second light distribution pattern.

2. The vehicle lamp system according to claim 1, wherein the processor is further configured to control the imaging unit to alternately repeat the first operation and the second operation.

3. The vehicle lamp system according to claim 1, wherein the processor is further configured to binarize the luminance in each of the plurality of individual regions, and
set a first illuminance value for an individual region having a relatively high luminance and set a second illuminance value higher than the first illuminance value for an individual region having a relatively low luminance.

4. The vehicle lamp system according to claim 1, wherein the processor is further configured to form a reference light distribution pattern independent of the illuminance value determined at a predetermined timing,
wherein the second time period is longer than the first time period, and
wherein the processor is further configured to perform the first operation under formation of the reference light distribution pattern.

5. The vehicle lamp system according to claim 1, wherein the processor is further configured to form a reference light distribution pattern independent of the illuminance value determined at a predetermined timing,
wherein the second time period is longer than the first time period, and
wherein the processor is further configured to perform the second operation under formation of the reference light distribution pattern.

6. The vehicle lamp system according to claim 1, wherein the processor is further configured to:
detect a predetermined target in front of the vehicle based on the information obtained from the imaging unit; and
detect a displacement of the predetermined target detected based on the detection result,
determine a specific illuminance value for a specific individual region determined according to a position of the target based on a detection result.

7. A vehicle lamp control device comprising:
a processor configured to:
control an imaging unit which is configured to take an image in front of a vehicle driven by a user to generate image information, so as to perform a combination of a first operation of generating image information with a first time period and a second operation of generating image information with a second time period having a length different from the first time period;
detect luminance of each of a plurality of individual regions arranged in front of a vehicle based on the image information obtained from the imaging unit;
determine an illuminance value of light to be radiated to each individual region based on a detection result so as to determine a light distribution pattern to be formed, wherein the processor is further configured to:
for an individual region whose luminance is within a predetermined high luminance range, set an illuminance value such that luminance of the individual region decreases due to formation of the light distribution pattern; and
for an individual region whose luminance is within a predetermined low luminance range, set an illuminance value such that luminance of the individual region increases due to formation of the light distribution pattern;
independently adjust illuminance of the light to be radiated to each of the plurality of individual regions, so as to form the light distribution pattern; and
form a first light distribution pattern based on a first image information generated in the first operation, and form a second light distribution pattern based on a second image information generated in the second operation, and
perform the second operation under formation of the first light distribution pattern, and perform the first operation under formation of the second light distribution pattern.

8. A vehicle lamp control method comprising:
controlling an imaging unit configured to take an image in front of a vehicle driven by a user to generate image information, so as to perform a combination of a first operation of generating image information with a first time period and a second operation of generating image information with a second time period having a length different from the first time period;
detecting luminance of each of a plurality of individual regions arranged in front of the own vehicle based on the image information obtained from the imaging unit;
determining an illuminance value of light to be radiated to each individual region based on the detected luminance so as to determine a light distribution pattern to be formed, the determining including:
for an individual region whose luminance is within a predetermined high luminance range, setting an illuminance value such that luminance of the individual region decreases due to formation of the light distribution pattern; and
for an individual region whose luminance is within a predetermined low luminance range, setting an illuminance value such that luminance of the individual region increases due to formation of the light distribution pattern;
independently adjusting illuminance of the light to be radiated to each of the plurality of individual regions, so as to form the light distribution pattern; and
forming a first light distribution pattern based on a first image information generated in the first operation, and forming a second light distribution pattern based on a second image information generated in the second operation, and
performing the second operation under formation of the first light distribution pattern, and performing the first operation under formation of the second light distribution pattern.

* * * * *